(12) United States Patent
Kenney et al.

(10) Patent No.: US 9,765,911 B2
(45) Date of Patent: Sep. 19, 2017

(54) SOIL PIPE COUPLER

(71) Applicant: McWane, Inc., Birmingham, AL (US)

(72) Inventors: William Martin Kenney, San Marcos, CA (US); Thomas Leonard, Quebec (CA)

(73) Assignee: McWane, Inc., Birmingham, AL (US)

( * ) Notice: Subject to any disclaimer, the term of this patent is extended or adjusted under 35 U.S.C. 154(b) by 151 days.

(21) Appl. No.: 14/733,106

(22) Filed: Jun. 8, 2015

(65) Prior Publication Data

US 2016/0356409 A1    Dec. 8, 2016

(51) Int. Cl.
| F16L 33/00 | (2006.01) |
| F16L 21/00 | (2006.01) |
| F16L 57/04 | (2006.01) |
| F16L 33/08 | (2006.01) |
| F16L 33/32 | (2006.01) |

(52) U.S. Cl.
CPC ............ *F16L 21/005* (2013.01); *F16L 57/04* (2013.01); *F16L 33/08* (2013.01); *F16L 33/32* (2013.01)

(58) Field of Classification Search
USPC .................. 285/417, 419, 236, 410
See application file for complete search history.

(56) References Cited

U.S. PATENT DOCUMENTS

| 3,233,922 A * | 2/1966 | Evans ................... F16L 21/005 24/19 |
| 3,565,468 A * | 2/1971 | Garrett ................. F16L 21/005 24/279 |
| 3,682,503 A * | 8/1972 | Bloom ................... F16L 21/005 285/345 |
| 3,813,116 A * | 5/1974 | Horsley ................ F16L 21/005 285/236 |
| 4,172,607 A * | 10/1979 | Norton .................. F16L 21/005 285/236 |
| 4,420,176 A * | 12/1983 | Cornwall .................. F16L 5/00 285/142.1 |
| 4,538,837 A * | 9/1985 | Cronk ................... F16L 21/005 285/148.11 |

(Continued)

OTHER PUBLICATIONS

"Rigid Quik™—Submittal Slip on Couplings" (specific sheet), *McWane, Inc.*, Sep. 3, 2015, 1 page; http://www.anaco-husky.com/upl/download/catalog/products/submittal-sheet-rigid-quik-d840f138.pdf.

*Primary Examiner* — Aaron Dunwoody
(74) *Attorney, Agent, or Firm* — Womble Carlyle Sandridge & Rice LLP

(57) ABSTRACT

The present invention relates to a soil pipe coupler that includes a body portion formed from a thermoplastic elastomer. The body portion includes an inner wall, an outer wall, and a first and second lip defined by the outer wall. The first lip is disposed proximate a first end, while a second lip is disposed proximate a longitudinally-opposed second end of the body portion. The body portion includes an annular seat and at least one rib member that extend radially inwards from the inner wall and further defines a channel extending from the first to the second end. The soil pipe coupler includes a sheathing member configured to wrap about the body portion and is disposed between the first and second lips. Additionally, the soil pipe coupler includes at least one clamp configured to operably engage the sheathing member. An associated method of installation is also provided.

19 Claims, 7 Drawing Sheets

(56) References Cited

U.S. PATENT DOCUMENTS

| | | | | |
|---|---|---|---|---|
| 4,538,839 A | * | 9/1985 | Ledgerwood | F16L 21/005 285/236 |
| 4,564,220 A | * | 1/1986 | Sills | F16L 21/005 285/236 |
| 4,643,465 A | * | 2/1987 | Green | F16L 21/005 285/236 |
| 5,039,137 A | | 8/1991 | Cankovic et al. | |
| 5,431,458 A | * | 7/1995 | Schaub | F16L 25/14 285/236 |
| 6,530,609 B1 | * | 3/2003 | Chatterton | F16L 33/03 285/23 |
| 7,264,020 B2 | * | 9/2007 | Wolk | F16L 21/005 138/89 |
| 7,731,242 B2 | * | 6/2010 | Coscarella | F16L 21/005 137/315.29 |
| 7,909,370 B1 | * | 3/2011 | Wilsey | F16L 21/005 285/235 |
| 8,651,532 B2 | * | 2/2014 | Felber | F16L 21/005 285/236 |
| 2005/0099003 A1 | * | 5/2005 | Tarara | F16L 21/005 285/236 |
| 2008/0284162 A1 | * | 11/2008 | Piscitelli | F16L 21/005 285/236 |

* cited by examiner

SOIL PIPE COUPLER

BACKGROUND

Field of the Disclosure

The present disclosure relates to a pipe coupler, and more particularly, to soil pipe couplers.

Description of Related Art

Soil pipes couplers are configured to connect a first soil pipe to a second soil pipe or fitting. Ideally, a soil pipe coupler will not leak or deform unduly under operating pressures, resists angular deflections between the first and second soil pipes that are coupled, effectively prevents and/or resists deformation due to shearing forces from misalignment between the first and second soil pipes, is resistant to fire damage, resists forces that may cause the first or second pipe to dislodge from the soil pipe coupler due to internal operating pressures; has a long service life, is easily assembled and/or installed, maintains concentric alignment between the first and second soil pipe, and is cost effective and easily maintainable.

One commonly used soil pipe coupler comprises a sealing element that includes a reasonably soft elastomeric material having a Shore Hardness of approximately between 55 and 70. Installation of the sealing element includes stretching the sealing element over a first pipe and a second pipe to form a sealed coupling between the first and second pipes, but requires separate application of any overlying structures and clamps to secure the sealing element to the first and second pipes. As such, installation of such a soil pipe coupler is a time-consuming process.

A second soil pipe coupler, as disclosed in U.S. Pat. No. 5,039,137, may provide relatively simpler installation as hose clamps can be installed concurrently with the clamping sleeve to a first and second pipe. However, since the soil pipe coupler disclosed therein consists solely of an elastomeric sleeve and hose clamps, the soil pipe coupler offers relatively little strength or resistance to fire. There remains a need in the art for a soil pipe coupler that offers a good balance of properties, such as many of those set forth above.

BRIEF SUMMARY OF THE DISCLOSURE

The above and other needs are met by aspects of the present disclosure which, in one aspect, provides a soil pipe coupler that includes a body portion formed from a semi-rigid thermoplastic material. In some aspects, the body portion includes an inner wall, an outer wall, a first lip defined by the outer wall and disposed proximate a first end of the body portion, a second lip defined by the outer wall and disposed proximate a second end of the body portion, wherein the first end is longitudinally-opposed to the second end of the body portion, an annular seat that extends radially inwards from the inner wall, and at least one rib member that also extends radially inwards from the inner wall. According to some aspects, the body portion defines a channel that extends longitudinally from the first end to the second end. Additionally, the soil pipe coupler may include a sheathing member that is configured to cover the outer wall of the body portion and is disposed between the first and second lips. In one aspect, the soil pipe coupler includes at least one clamp configured to operably engage the sheathing member.

In another aspect, the soil pipe coupler may include an annular seat that extends radially inward from the inner wall and divides the channel into a first portion and a second portion. The annular seat may further define an orifice therethrough so as to provide for fluid connection and communication between the first portion and the second portion of the channel.

In one aspect, the soil pipe coupler may include a body portion that further includes at least one ridge member that extends radially outwards from the outer wall.

According to another aspect, the soil pipe coupler may include a sheathing member that defines at least one orifice. In another aspect, the at least one clamp of the soil pipe coupler may define at least one orifice. Additionally or alternatively, the at least one clamp of the soil pipe coupler may define at least one slot. In some aspects, the at least one clamp may be configured to operably engage the sheathing member by fastening a connector (e.g., a rivet) to the orifice of the at least one clamp and to a corresponding at least one orifice defined by the sheathing member. Additionally or alternatively, the at least one clamp may be configured to engage the sheathing member by fastening a connector (e.g., a rivet) to the slot of the at least one clamp and to a corresponding at least one orifice defined by the sheathing member.

In some aspects, the at least one clamp may be affixed to the sheathing member. According to another aspect, the soil pipe coupler may include two clamps that are spaced apart from one another. Additionally, each of the two clamps may be affixed and/or operably engaged with the sheathing member.

In another aspect, the sheathing member may include an inner surface and an opposing outer surface. In some aspects, the inner and opposing outer surfaces may each define a corrugated surface. Additionally or alternatively, the sheathing member may comprise a metal configured to be fire-resistant. According to another embodiment, the thermoplastic elastomer of the body portion may have a Shore Hardness of at least 70.

Another aspect of the present disclosure provides a method of installing a soil pipe coupler. In one aspect, the method may include receiving a complete soil pipe coupler that includes a body portion formed from a thermoplastic elastomer. The body portion may include an inner wall, an outer wall, a first lip defined by the outer wall and disposed proximate a first end of the body portion, and a second lip defined by the outer wall and disposed proximate a second end of the body portion. The first end of the body portion may be longitudinally-opposed to the second end of the body portion. In some aspects, the soil pipe coupler may include a body portion that includes an annular seat that extends radially inwards from the inner wall and at least one rib member that extends radially inwards from the inner wall. In another aspect, the body portion may define a channel that extends from the first end to the second end. Additionally or alternatively, the soil pipe coupler may include a sheathing member configured to substantially cover the outer wall of the body portion and disposed between the first and second lips such that the first and second lips will abut the sheathing member upon longitudinal movement thereof, and at least one clamp configured to operably engage the sheathing member.

According to another aspect of the present disclosure, a method of installing a soil pipe coupler may include inserting a first end of a first pipe into the soil pipe coupler, inserting a first end of a second pipe into the soil pipe coupler, and engaging the at least one clamp so as to secure the first pipe and second pipe to the soil pipe coupler.

In some aspects, the method may include inserting the first end of the first pipe into the soil pipe coupler such that the first end of the first pipe abuts a first surface of the annular seat. Additionally or alternatively, the method may include inserting the first end of the second pipe into the soil pipe coupler such that the first end of the second pipe abuts an opposing second surface of the annular seat.

In one aspect, the method may include engaging a first and a second clamp that are spaced apart from one another and both affixed to a sheathing member so as to secure the body portion of the soil pipe coupler to the first and second pipes respectively. In another aspect, the body portion of the soil pipe coupler may have a Shore Hardness of at least 70.

These and other features, aspects, and advantages of the disclosure will be apparent from a reading of the following detailed description together with the accompanying drawings, which are briefly described below.

BRIEF DESCRIPTION OF THE DRAWINGS

Figure 1A:
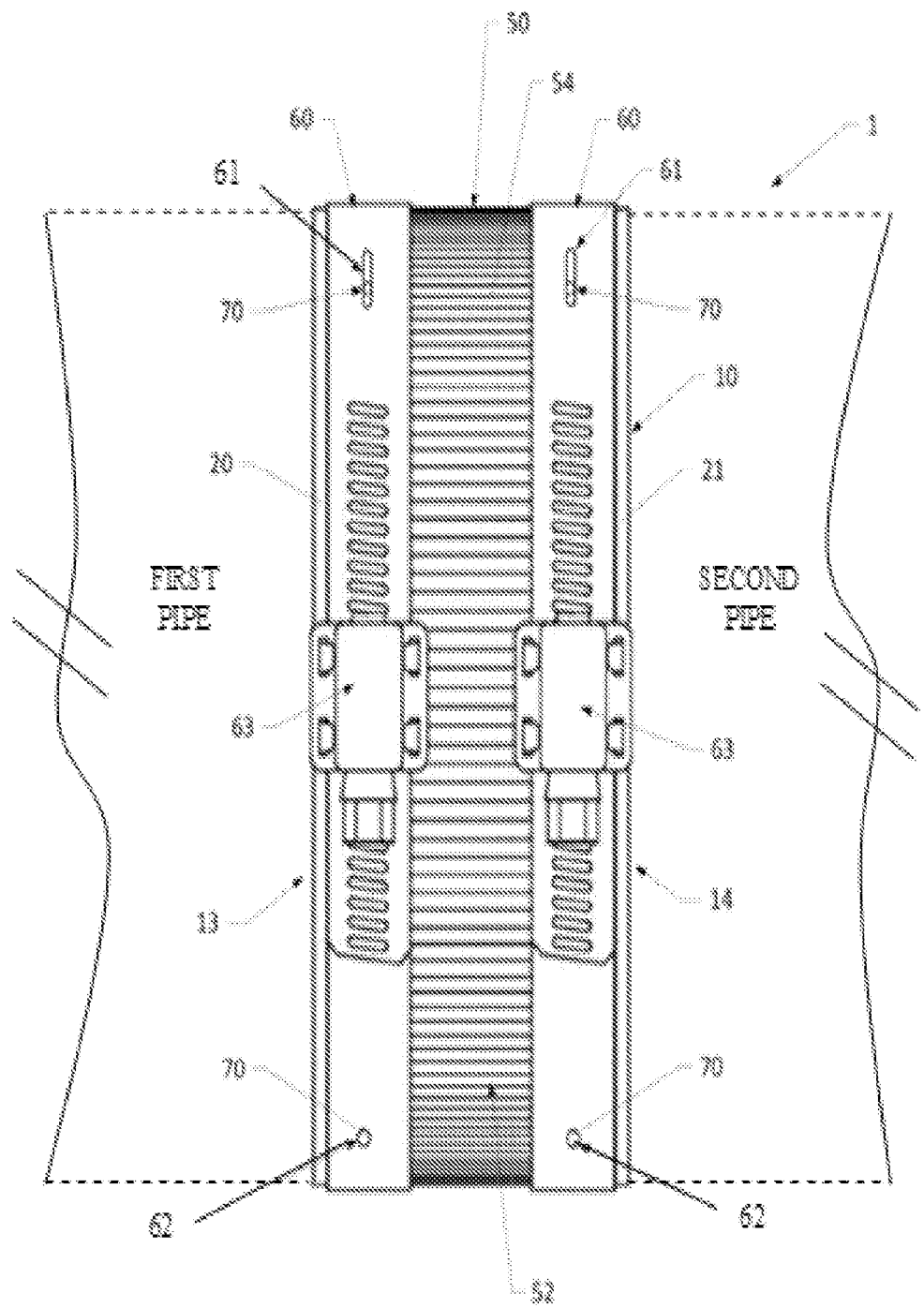
Figure 1B:
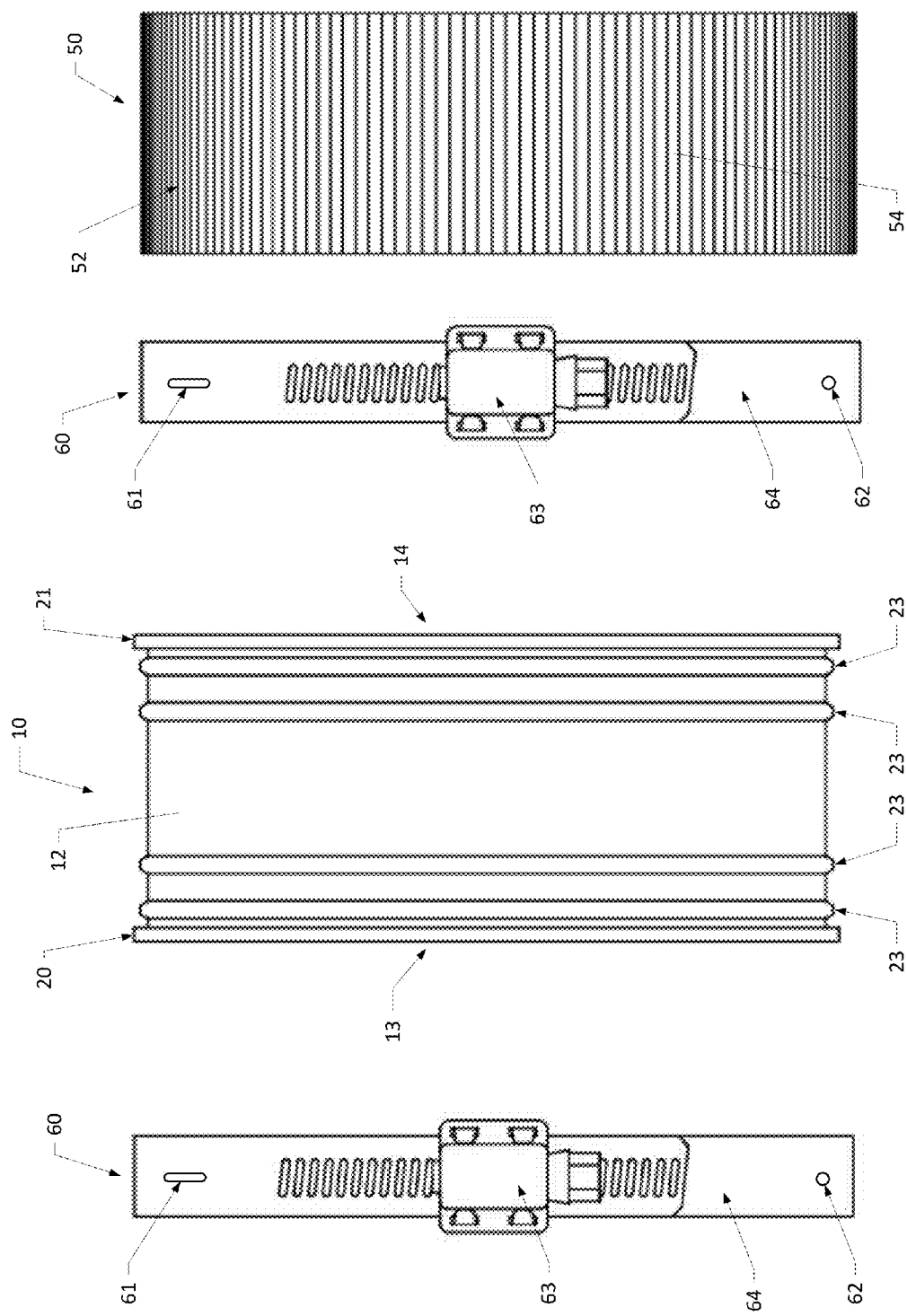
Figure 2:
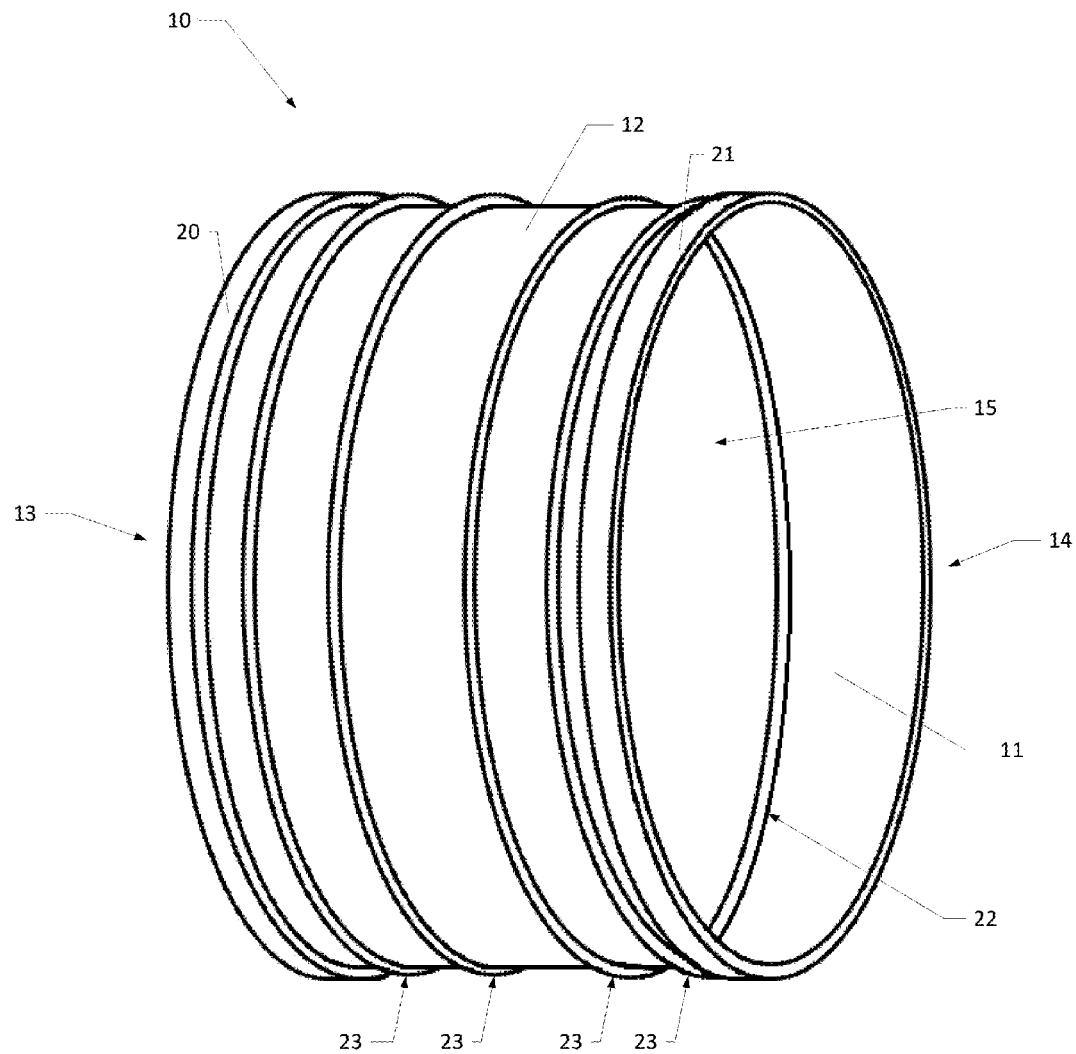
Figure 3:
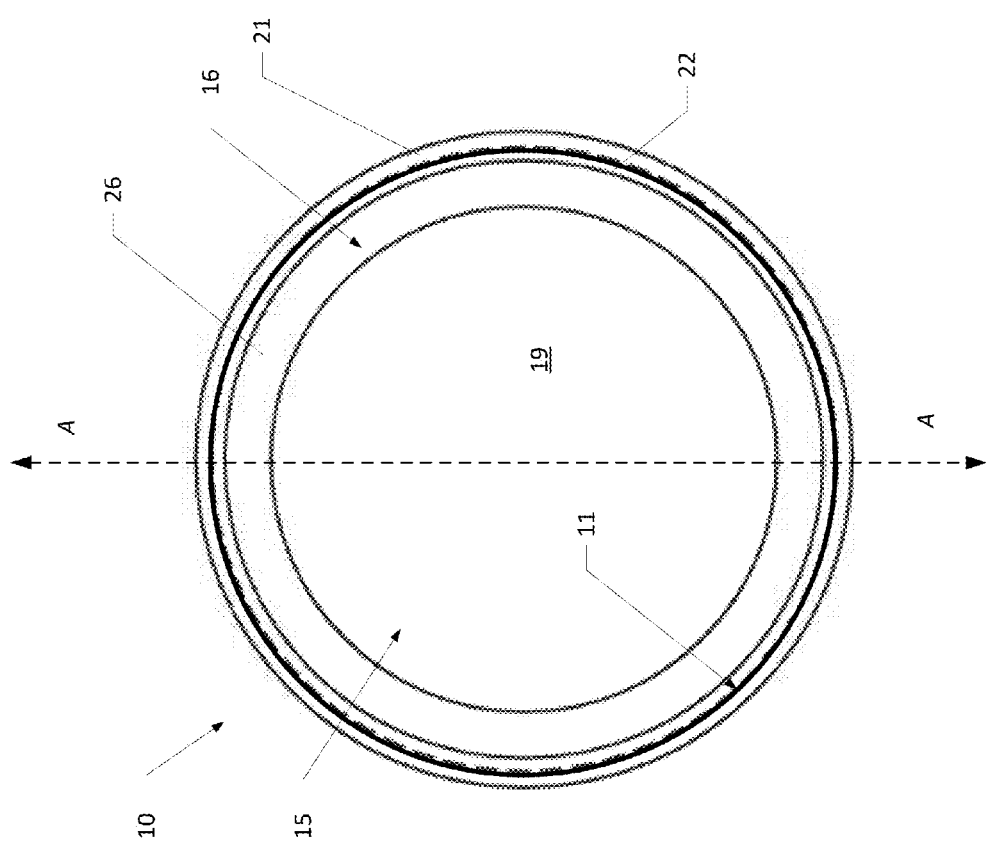
Figure 4:
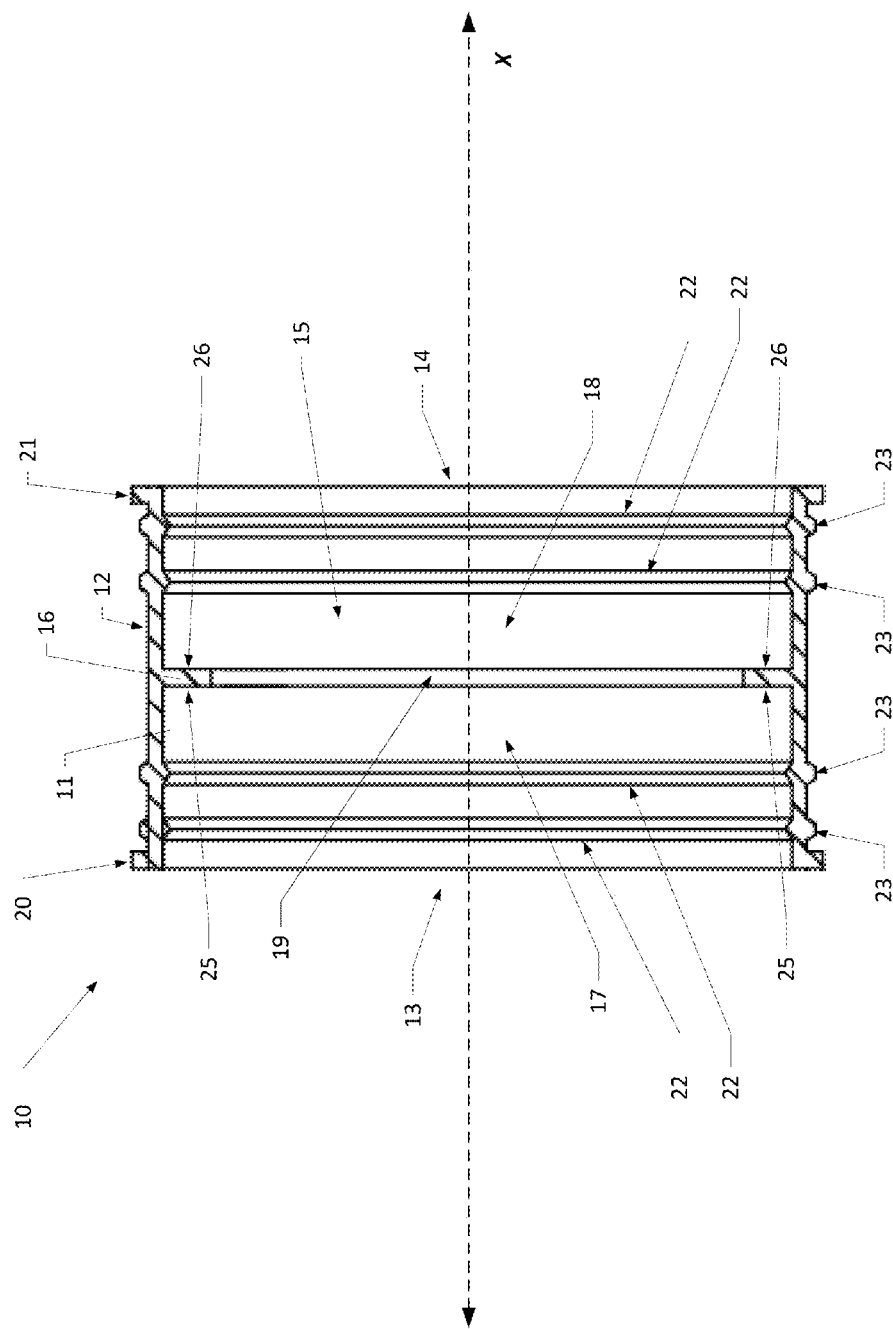
Figure 5A:
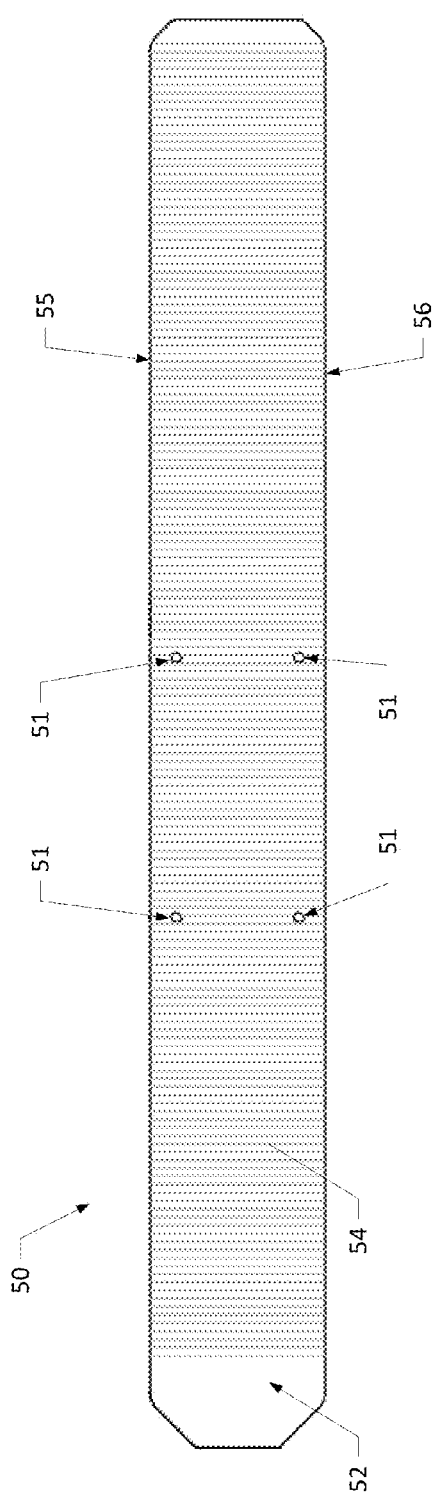
Figure 5B:
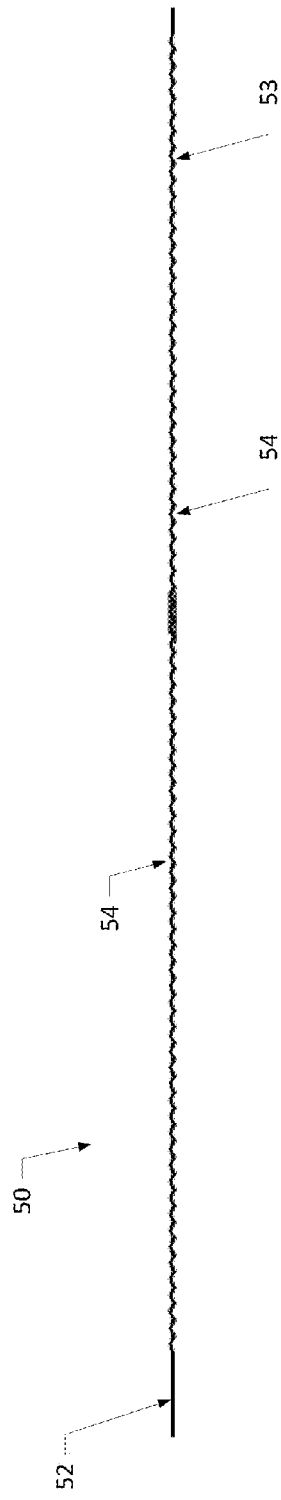
Figure 6:
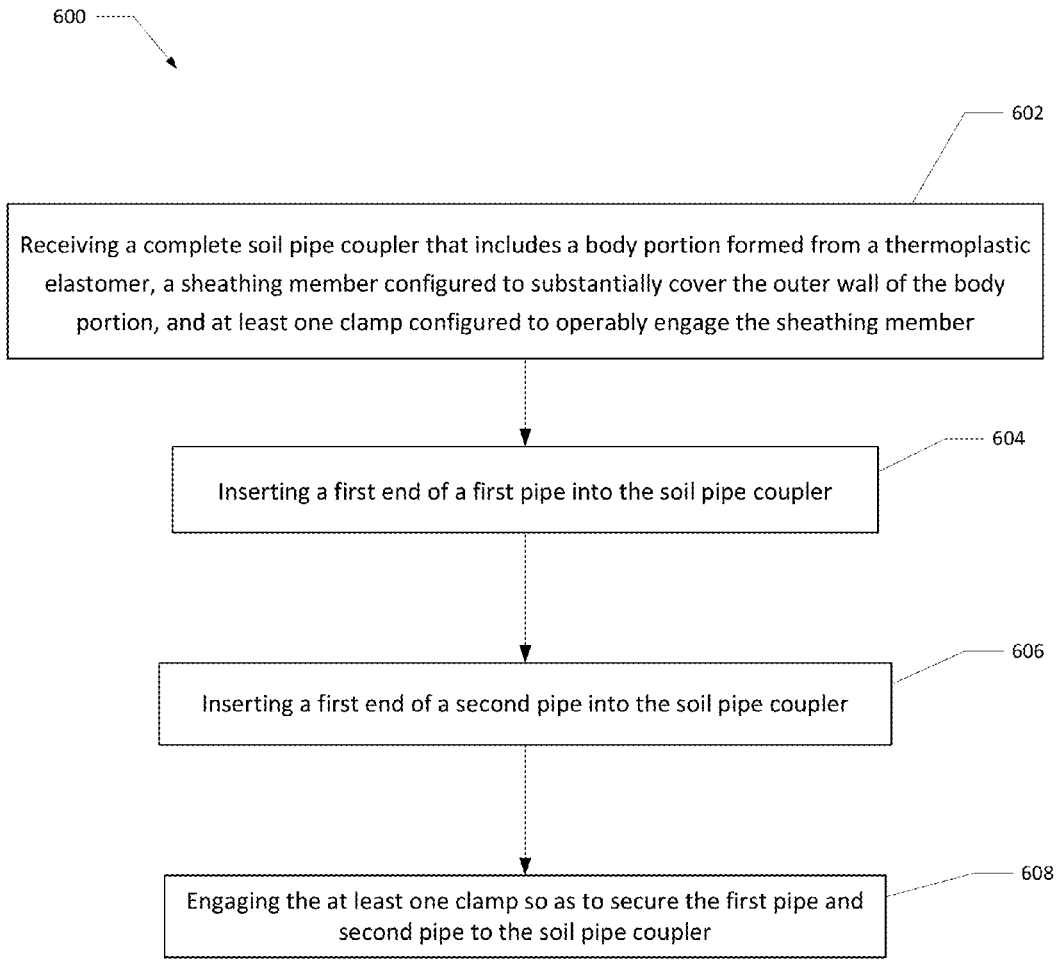

Having thus described the disclosure in the foregoing general terms, reference will now be made to the accompanying drawings, which are not necessarily drawn to scale, and wherein:

FIG. 1A illustrates a side view of soil pipe coupler according to one aspect of the present disclosure;

FIG. 1B illustrates an exploded side view of a soil pipe coupler according to one aspect of the present disclosure;

FIG. 2 illustrates a side perspective view of a body portion of a soil pipe coupler according to one aspect of the present disclosure;

FIG. 3 illustrates a front view of a body portion of a soil pipe coupler according to one aspect of the present disclosure;

FIG. 4 illustrates a cross-sectional view of the body portion of FIG. 3 taken along line A-A according to one aspect of the present disclosure;

FIG. 5A illustrates a top view of a sheathing member of a soil pipe coupler according to one aspect of the present disclosure;

FIG. 5B illustrates a side view of a sheathing member of a soil pipe coupler according to one aspect of the present disclosure; and FIG. 6 illustrates a schematic block diagram of a method of installing a soil pipe coupler according to one aspect of the present disclosure.

DETAILED DESCRIPTION OF THE DISCLOSURE

The present disclosure will now be described more fully hereinafter with reference to exemplary aspects thereof. These exemplary aspects are described so that this disclosure will be thorough and complete, and will fully convey the scope of the disclosure to those skilled in the art. Indeed, the disclosure may be expressed in many different forms and should not be construed as limited to the aspects set forth herein; rather, these aspects are provided so that this disclosure will satisfy applicable legal requirements. As used in the specification, and in the appended claims, the singular forms "a", "an", "the", include plural referents unless the context clearly dictates otherwise.

The present disclosure is directed to a soil pipe coupler (and the use thereof) configured to attach a first soil pipe to a second soil pipe. In some aspects, as shown in FIGS. 1A and 1B, the soil pipe coupler 1 may include a main body portion 10, a sheathing member 50, and at least one clamp 60. In some aspects, the soil pipe coupler may include two clamps 60 configured to operably engage and secure the sheathing member 50 to the body portion 10.

According to one aspect, a soil pipe coupler 1 includes a body portion 10 formed from a thermoplastic elastomer (TPE), particularly thermoplastic vulcanizates (TPV) which combine a cross-linked rubber (e.g., EPDM rubber) with a thermoplastic polymer material such as a polyolefin. Suitable thermoplastic elastomers are commercially available, such as Santoprene™ brand TPV materials available from ExxonMobil Chemical (e.g., Santoprene™ grade 101-87). Advantageously, the thermoplastic elastomer will be relatively rigid to facilitate assembly, such as thermoplastic elastomers having a Shore Hardness of at least about 70, at least about 80, or at least about 90, as measured according to ISO 868:2003. In certain embodiments, the Shore Hardness is about 70 to about 95, such as about 75 to about 95.

As particularly shown in FIGS. 2, 3 and 4, the body portion 10 may include an inner wall 11 and an opposing outer wall 12. In some aspects, the inner wall 11 and outer wall 12 of the body portion 10 may define a hollow cylindrical shaped body portion. Although various aspects of the present disclosure described herein and FIGS. 2 and 3 disclose the body portion 10 having a substantially hollow cylindrical shape defined by the inner and outer walls 11, 12, other suitable body portion shapes (e.g., tubular cube, tubular cuboid, tubular polygonal prism, etc.) are also encompassed by the present disclosure. In particular, the body portion 10 may be any suitable shape configured to couple a complementarily shaped first soil pipe to a similarly complementarily shaped second soil pipe.

According to one aspect, the inner wall 11 and the outer wall 12 of the body portion 10 may extend longitudinally from a first end 13 to an opposing second end 14 of the body portion. According to some aspects, the outer wall 12 of the body portion 10 may define a first lip 20 and a second lip 21. In particular, the first lip 20 may be disposed proximate to the first end 13 of the body portion 10, while the second lip 21 may be disposed proximate to the second end 14 of the body portion. As shown in FIGS. 1B and 4, the first and second lip 20, 21 may extend radially outward from the outer wall 12. As discussed in greater detail herein, the body portion 10 may include at least one ridge member 23 that also extends radially outward from the outer wall 12. According to some aspects, the first and second lip 20, 21 may extend radially outwards from the outer wall 12 for a distance greater than any other portion of the body portion 10 that also extends radially outwards from the outer wall such as, for example, any of the ridge members 23. As such, the first and second lip 20, 21 may be configured to retain the sheathing member so as to prevent longitudinal movement of the sheathing member 50 and/or prevent the sheathing member from becoming disengaged with the body portion 10. In one aspect, the first and second lip 20, 21 may extend approximately between 0.090 inches to approximately 0.10 inches from the outer wall 12. According to another aspect, the first and second lip 20, 21 may extend approximately 0.094 inches from the outer wall 12. In some aspects, the at least one ridge member 23 may extend approximately 0.050 inches from the outer wall 12. As such, the sheathing member 50 may be a sheathing member 50 configured to substantially cover the outer wall 12 of the body portion 10 and extend longitudinally from the proximate the first end 13 to proximate the second end 14. In particular, the difference in height between first and second lips 20, 21 and any other portion extending radially from the outer wall 12 provides a height differential that allows for the sheathing member 50 to be wrapped around the body portion 10 between the first and second lip and be retained therebetween such that the first and second lips will abut the sheathing member upon any longitudinal movement of the sheathing member toward either the first or second end 13, 14. In this regard, the first and second lips 20, 21 are configured to prevent separation of the sheathing member 50 from the body portion 10 when the sheathing member moves longitudinally.

As shown in FIGS. 3 and 4, the body portion 10 may further include an annular seat 16 that extends radially inward from the inner wall 11. Additionally, the annular seat 16 may further divide the body portion 10 into a first portion 17 and a second portion 18. In some aspects, the annular seat 16 may be disposed proximate the midpoint between the first end 13 and the second end 14 of the body portion 10 so as to divide the body portion into equivalently sized first and second portions 17, 18. Alternatively, the annular seat 16 may be disposed away from the midpoint so as to divide the body portion into two differently sized first and second portions.

In one aspect, the annular seat 16 defines a first annular surface 25 and an opposing second annular surface 26. Particularly, the first annular surface 25 is exposed to the first portion 17, while the second annular surface 26 is exposed to the second portion 18 of the body portion 10. As such, a first pipe may be inserted within the first portion 17 until an end of the first pipe engages the first annular surface 25 of the annular seat 16. Likewise, a second pipe, which is to be coupled with the first pipe, may be inserted within the second portion 18 until an end of the second pipe engages the second annular surface 26 of the annular seat 16. Accordingly, the first pipe and the second pipe that are to be coupled with an exemplary soil pipe coupler 1 according to aspects of the present disclosure may be inserted into the body portion 10 until they engage a respective surface of the annular seat 16. As such, in one aspect where the annular seat 16 divides the body portion 10 into equally sized first and second portions 17, 18, the portions of the first and second pipes inserted into the body portion may also be equally sized such that the body portion provides substantially equivalent engagement forces to each of the first and second pipes.

Additionally, the annular seat 16 may define an orifice 19 configured to fluidly connect and communicate the first portion 17 of the body portion 10 to the second portion 18 of the body portion. In some aspects, the body portion 10 may further define a channel 15 that extends longitudinally from the first end 13 to the opposing second end 14. The channel 15 may be configured to fluidly connect a first pipe operably engaged with the soil pipe coupler 1 with a second pipe that is also operably engaged with the soil pipe coupler. In particular, the channel 15 may be configured to provide for fluid communication between a first pipe and a second pipe that are operably engaged by the soil pipe coupler 1. Additionally or alternatively, the annular seat 16 may also divide the channel 15 so as to provide a first channel and a second channel that are in fluid connection and communication with one another via the orifice 19 defined by the annular seat.

According to another aspect, the body portion 10 may further include at least one rib member 22. For example, according to some aspects, the inner wall 11 may define at least one rib member 22 that extends radially inward from the inner wall. As shown in an exemplary aspect illustrated in FIG. 4, the inner wall 11 may define four rib members 22 that extend radially inward from the inner wall. Additionally or alternatively, the body portion 10 may include a first number of rib member(s) 22 disposed within the first portion 17 of the body portion and according to some aspects, may further include an equivalent, second number of rib member(s) 22 disposed within the second portion 18 of the body portion.

According to some aspects, the body portion 10 may further include at least one ridge member 23. As shown in FIG. 4, the outer wall 12 may define at least one ridge member 23 that extends radially outward from the outer wall. In some aspects, the outer wall may define four ridge members 23 that extend radially outward from the outer wall. Additionally or alternatively, at least one ridge member 23 may be concentrically aligned with at least one rib member 22 about a longitudinal axis X that extends from the first end 13 of the body portion 10 to the second end 14 of the body portion. In some aspects, the at least one ridge member 23 may be coplanar and concentrically aligned with the at least one rib member 22 about the longitudinal axis X. That is, the at least one ridge member 23 disposed on the outer wall 12 may be directly opposed from at least one corresponding rib member 22 disposed on the inner wall 11.

In some aspects, the at least one ridge member 23 disposed on the outer wall 12 and the at least one rib member 22 disposed on the inner wall 11 provides for an uneven surface along the inner and outer walls. That is, the at least one ridge member 23 may be configured to provide for enhanced engagement with a sheathing member 50 and/or at least one clamp 60 by providing additional gripping surface area to engage the sheathing member and/or the at least one clamp with the uneven surface of the outer wall. In particular, the at least one rib member 22 may be configured to provide for enhanced engagement with a soil pipe by providing the inner wall 11 with additional gripping surface area to engage a soil pipe inserted within the channel 15. Additionally or alternatively, the at least one rib member 22 may be configured to provide additional frictional forces to the soil pipe when the soil pipe coupler is operably engaged with a soil pipe inserted therein. In particular, the at least one rib member 22 may be configured to operably engage and/or secure a pipe within the soil pipe coupler when a corresponding clamp 60 operably engages the sheathing member 50 and/or the at least one corresponding ridge member 22 disposed opposite of the at least one rib member. As such, the at least one rib member 22 may resist shearing forces that bias the pipe longitudinally from the soil pipe coupler 1.

As shown in FIGS. 1A and 1B, the soil pipe coupler 1 may include a sheathing member 50 configured to substantially cover the outer wall 12 of the body portion 10. In some aspects, when wrapped about the body portion 10, the sheathing member 50 may extend longitudinally from the first end 13 to the second end 14 of the body portion. As previously mentioned, the first and second lip 20, 21, may be configured to retain the sheathing member 50 longitudinally along the outer surface 12 of the body portion 10 between the first and second lip and prevent longitudinal movement of the sheathing member. In some aspects, when the sheathing member 50 is operably engaged with the body portion 10, the sheathing member 50 provides additional strength to the body portion to resist deformation of the body portion. Additionally, the sheathing member 50 may be configured to provide additional strength to the body portion to resist shearing forces that may otherwise dislodge, offset, or misalign the first and second pipes when coupled to one another with the soil pipe coupler 1, thereby producing increased flow resistance within the first and second pipes and/or the channel 15.

Additionally, the sheathing member 50 may comprise a fire-resistant material. The sheathing member 50 may comprise a stainless steel, aluminum, cast iron, or a similar metal, having a melting temperature between approximately 1150° C. and 1450° C. As such, during an undesirable event where the soil pipe coupler 1 is exposed to extremely hot temperatures such as in a fire, the body portion 10 may degrade, deform, and/or deteriorate so as to become structurally unstable, while the sheathing member 50 substantially maintains its structural integrity so as to maintain operably engagement between each of the first and second pipes and the soil pipe coupler 1. As such, the sheathing member 50 may be configured to be fire resistant so as to maintain a fluid connection and alignment between the first and second pipes coupled by the soil pipe coupler 1 during an undesirable event that may cause the ambient temperatures surrounding the soil pipe coupler 1 to exceed the melting point temperature of the body portion 10.

As shown in FIGS. 5A and 5B, the sheathing member 50 may further include a first surface 52 and an opposing second surface 53. According to one aspect, the second surface 52 of the sheathing member 50 may contact the outer wall 12 and/or at least one of the ridge members 23 when the sheathing member is wrapped about the body portion 10 of the soil pipe coupler. Additionally, the first surface 52 and the second surface 53 may each define a corrugated surface 54. In some aspects, the corrugated surface 54 may advantageously provide for expansion and/or compression of the sheathing member 50 when operably engaged with the body portion 10.

According to one aspect, the sheathing member 50 may define at least one orifice 51 that extends from the first surface 52 to the second surface 53. The orifice(s) 51 may be configured to receive a connector 70 (e.g., a rivet) therethrough. In particular, the connector 70 may be configured to securely fasten the sheathing member 50 to corresponding features defined by each of the respective clamps 60 as shown in FIG. 1A. Returning to FIG. 5A, the orifice(s) 51 may be disposed proximate a first and second lateral edge 55, 56 of the sheathing member 50. Additionally, the orifice(s) 51 are disposed proximate the first and second lateral edge 55, 56 such that when the sheathing member 50 is operably engaged with each of the respective clamp(s) 60, the orifice(s) 51 of the sheathing member may be aligned with a corresponding feature defined by the clamp 60. Accordingly, when the sheathing member is operably engaged with each of the respective clamps 60, each of the connector(s) 70 may engage a respective orifice 51 defined by the sheathing member 50 and a corresponding feature defined by the clamp 60, as described in greater detail below.

Returning to FIGS. 1A, 1B and 2, a soil pipe coupler 1 according to one aspect may include at least one clamp 60 such as, for example, a hose clamp. As shown in FIGS. 1A, 1B and 2, the soil pipe coupler 1 may include two clamps 60 configured to operably engage a sheathing member 50. In particular, each of the clamps 60 may define an orifice 62 and a slot 61. Additionally, each of the clamps 60 may include a band portion 64 and a fastening portion 63 configured to fasten a first end of the band portion to a longitudinally opposing second end of the band portion. Accordingly, the band portion 64 may be wrapped into a substantially cylindrical shape similar to the body portion 10 of the soil pipe coupler 1 and the first end of the band portion may be securely affixed to the second end by the fastening portion 63. As shown in FIGS. 1A and 1B, the fastening portion 63 may include a captive screw, and the band portion 64 may define a screw pattern. As known to one of ordinary skill in the art, engaging a captive screw configured to mate with the screw pattern defined by the band portion 64 may secure a first end of the band portion to the opposing end of the band portion. Additional revolutions of the captive screw may urge the band portion to move through the fastening portion, thereby decreasing the circumference of the cylindrical shape of the clamp 60.

As such, the clamps 60 may operably engage the sheathing member 50 by first aligning the orifice 62 defined by the clamp 60 with the orifice 51 defined by the sheathing member 50 and securely fastening a connector 70 through the respective orifices 51, 62. Subsequently, a first end of the band portion 64 of the clamp may pass through the fastening portion 63 such that a captive screw of the fastening portion engages the screw pattern defined by the band portion thereby providing for the tightening and loosening of the clamp 60 based upon which direction the captive screw rotates while the fastening portion 63 is engaged with the band portion 64.

Accordingly, in one aspect, the soil pipe coupler 1 in an unassembled state may include the body portion 10 and the securely fastened sheathing member 50/clamp 60 assembly. Additionally, the sheathing member/clamp assembly may have a circumference that is greater than the circumference of the body portion 10 in the unassembled state. As such, the sheathing member/clamp assembly may be placed over the body portion, and the fastening portion 63 of the clamp may be engaged so as to decrease the circumference of the sheathing member/clamp assembly to approximately the circumference of the outer wall 12, ridge member 23, and/or the first lip 20 and/or the second lip 21 of the body portion 10 so as to form the soil pipe coupler 1 in an assembled state. In this regard, the slot(s) 61 defined by the band portion 64 of the clamp 60 allow for the connector 70 that is fixedly attached to the orifice 51 of the sheathing member 50 to move freely along the length of the slot from one end of the slot to an opposing end. As such, the slot(s) 61 necessarily define a minimum and maximum circumference of the sheathing member 50/clamp 60 assembly. Additionally or alternatively, in the assembled state, the sheathing member 50/clamp 60 assembly may be disposed longitudinally between the first and second lip 20, 21 of the body portion, and further, may have a circumference that is less than the circumference of the first and second lips.

According to one aspect, engagement of the clamps 60, and thus the sheathing member 50 with respect to the body portion 10, may cause the second surface 53 of the sheathing member to engage at least one of the ridge member 23 and/or the outer surface 12 of the body portion. Additionally or alternatively, further engagement of the fastening portion 63 of the respective clamps 60 may cause the body portion 10 to contract such that an inner surface 11 and/or at least one rib member 22 contacts the first or second pipe being coupled to one another. In some aspects, the first or second pipes may be inserted within the first and second portions 17, 18 of the body portion respectively such that only the rib member(s) 22 contact the outer surface of the first and second pipes. As such, when the fastening portion 63 of the clamps 60 are engaged, the body portion may compress, contract, or otherwise deform such that additional surface area of the inner wall 11 and/or the rib member(s) engage and secure the first and second pipes in a coupled position (i.e., a position where respective ends of the first and second pipes contact respective surfaces of the annular seat).

According to one aspect, the disclosure may also be associated with corresponding methods such as, for example, a method of installing a soil pipe coupler. Referring to FIG. 6, a method 600 of installing a soil pipe coupler may include receiving a complete soil pipe coupler 602. In one aspect, the complete soil pipe coupler may include a body portion such as, for example, the body portion 10, as illustrated in FIGS. 1A-4, which may be formed from a thermoplastic elastomer having a Shore Hardness of at least 70. Additionally, the body portion may include an inner wall and an outer wall. In some aspects, the body portion may include a first lip defined by the outer wall that is disposed proximate a first end of the body portion and a second lip defined by the outer wall that is disposed proximate a second end of the body portion, which may be longitudinally-opposed to the first end. According to some aspects, the body portion may further include an annular seat that extends radially inward from the inner wall and at least one rib member that also extends radially inward from the inner wall. In one aspect, the body portion may define a channel that extends from the first end to the second end. Additionally, the complete soil pipe coupler may include a sheathing member that is configured to substantially cover the outer wall of the body portion. The sheathing member may be disposed between the first and second lips such that the first and second lips will abut the sheathing member upon longitudinal movement thereof. In one aspect, the complete soil pipe coupler may include at least one clamp that is configured to operably engage the sheathing member.

According to one aspect, the method 600 may further include inserting a first end of a first pipe into the soil pipe coupler 604. In some aspects, the method may include inserting the first end of the first pipe into the soil pipe coupler such that the first end of the first pipe abuts a first surface of the annular seat such as, for example, the first annular surface 25, as particularly illustrated in FIG. 4.

The method may further include inserting a first end of a second pipe into the soil pipe coupler 606. According to one aspect, the method may include inserting the first end of the second pipe into the soil pipe coupler such that the first end of the second pipe abuts a second surface of the annular seat such as, for example, the second annular surface 26, as particularly illustrated in FIG. 4 as well.

As shown in FIG. 1A, a complete soil pipe coupler according to one aspect may include a first and second clamp, each of the clamps being configured to secure the first and second pipe to the main body portion of the complete soil pipe coupler respectively. In one aspect, the method 600, as shown in FIG. 6, may include engaging at least one clamp so as to secure the first and second pipe to the complete soil pipe coupler. In particular, the complete soil pipe coupler may include a first and second clamp spaced apart from one another and both being affixed to the sheathing member such that engaging the first and second clamp secures the first and second pipe to the complete soil pipe coupler respectively. In some certain advantageous aspects, a complete soil pipe coupler may be a single unit ready for operably engagement with the first and second pipes respectively. In this regard, the complete soil pipe coupler may include a sheathing member already operably engaged with and/or securely attached to at least one clamp. In another advantageous aspect, a complete soil pipe coupler may include the operably engaged sheathing member and the at least one clamp assembly being disposed proximate to and/or operably engaged with the main body portion of the soil pipe coupler. Thus, such an advantageous aspect may provide the soil pipe coupler as a single unit ready for installation. Unlike other soil pipe couplers known to those skilled in the art, this advantageous aspect may provide for engaging a first pipe with a complete, single unit (i.e., complete soil pipe coupler) and subsequently engaging a second pipe with the complete, single unit without requiring the assembly of multiple parts of the soil pipe coupler. As such, one method of the present disclosure may provide for inserting a first end of a first pipe into the soil pipe coupler, inserting a first end of a second pipe into the soil pipe coupler, and engaging at least one clamp of the soil pipe coupler so as to secure the first and second pipes to the soil pipe coupler without having to attach, connect, join, link, affix, bond and/or the like, any portion of the soil pipe coupler to another portion of the soil pipe coupler.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed herein and that modifications and other aspects are intended to be included within the scope of the appended claims. Although specific terms are employed herein, they are used in a generic and descriptive sense only and not for purposes of limitation.

That which is claimed:

1. A soil pipe coupler comprising:
a body portion formed from a thermoplastic elastomer, wherein the body portion includes:
an inner wall;
an outer wall;
a first lip defined by the outer wall and disposed proximate a first end of the body portion;
a second lip defined by the outer wall and disposed proximate a second end of the body portion, the first end being longitudinally-opposed to the second end of the body portion;
an annular seat extending radially inwards from the inner wall; and
at least one rib member that extends radially inwards from the inner wall,
wherein the body portion defines a channel that extends from the first end to the second end;
a sheathing member configured to substantially cover the outer wall of the body portion and disposed between the first and second lips such that the first and second lips will abut the sheathing member upon longitudinal movement thereof;
at least one clamp configured to operably engage the sheathing member; and
at least one ridge member that extends radially outwards from the outer wall.

2. The soil pipe coupler of claim 1, wherein the annular seat extending radially inward from the inner wall divides the channel into a first portion and a second portion, the annular seat further defining an orifice therethrough so as to provide for fluid connection and communication between the first portion and the second portion of the channel.

3. The soil pipe coupler of claim 1, wherein the sheathing member defines at least one orifice.

4. The soil pipe coupler of claim 3, wherein the at least one clamp defines at least one orifice.

5. The soil pipe coupler of claim 4, wherein the at least one clamp is configured to operably engage the sheathing member by fastening a connector to the orifice of the at least one clamp and to the at least one orifice of the sheathing member.

6. The soil pipe coupler of claim 3, wherein the at least one clamp defines at least one slot.

7. The soil pipe coupler of claim 6, wherein the at least one clamp is configured to operably engage the sheathing member by fastening a connector to the slot of the at least one clamp and to the at least one orifice of the sheathing member.

8. The soil pipe coupler of claim 1, wherein at least one clamp is affixed to the sheathing member.

9. The soil pipe coupler of claim 8, wherein there are two clamps spaced apart from one another and both clamps are affixed to the sheathing member.

10. The soil pipe coupler of claim 1, wherein the sheathing member includes an inner surface and an opposing outer surface, wherein the inner and opposing outer surfaces each define a corrugated surface.

11. The soil pipe coupler of claim 1, wherein the sheathing member comprises a metal.

12. The soil pipe coupler of claim 1, wherein the thermoplastic elastomer of the body portion has a Shore Hardness of at least 70.

13. The soil pipe coupler of claim 1, wherein the at least one ridge member is concentrically aligned with the at least one rib member.

14. A method of installing a soil pipe coupler comprising: providing a complete soil pipe coupler comprising:
   a body portion formed from a thermoplastic elastomer, wherein the body portion includes:
   an inner wall;
   an outer wall;
   a first lip defined by the outer wall and disposed proximate a first end of the body portion;
   a second lip defined by the outer wall and disposed proximate a second end of the body portion, the first end being longitudinally-opposed to the second end of the body portion;
   an annular seat extending radially inwards from the inner wall; and
   at least one rib member that extends radially inwards from the inner wall,
   wherein the body portion defines a channel that extends from the first end to the second end;
   a sheathing member configured to substantially cover the outer wall of the body portion and disposed between the first and second lips such that the first and second lips will abut the sheathing member upon longitudinal movement thereof;
   at least one clamp configured to operably engage the sheathing member; and
   at least one ridge member that extends radially outwards from the outer wall;
   inserting a first end of a first pipe into the soil pipe coupler;
   inserting a first end of a second pipe into the soil pipe coupler; and
   engaging the at least one clamp so as to secure the first pipe and second pipe to the soil pipe coupler.

15. The method of claim 14, wherein inserting the first end of the first pipe into the soil pipe coupler further comprises inserting the first end of the first pipe into the soil pipe coupler such that the first end of the first pipe abuts a first surface of the annular seat.

16. The method of claim 15, wherein inserting the first end of the second pipe into the soil pipe coupler further comprises inserting the first end of the second pipe into the soil pipe coupler such that the first end of the second pipe abuts an opposing second surface of the annular seat.

17. The method of claim 14, wherein the soil pipe coupler includes a first and a second clamp spaced apart from one another and both affixed to the sheathing member, the method further comprising engaging the first and second clamps to secure the soil pipe coupler to the first and second pipes.

18. The method of claim 14, wherein the thermoplastic elastomer of the body portion has a Shore Hardness of at least 70.

19. The method of claim 14, comprising concentrically aligning the at least one ridge member with the at least one rib member.

* * * * *